H. CUNNING.
PUMP.
APPLICATION FILED JUNE 14, 1906.
930,940.
Patented Aug. 10, 1909.
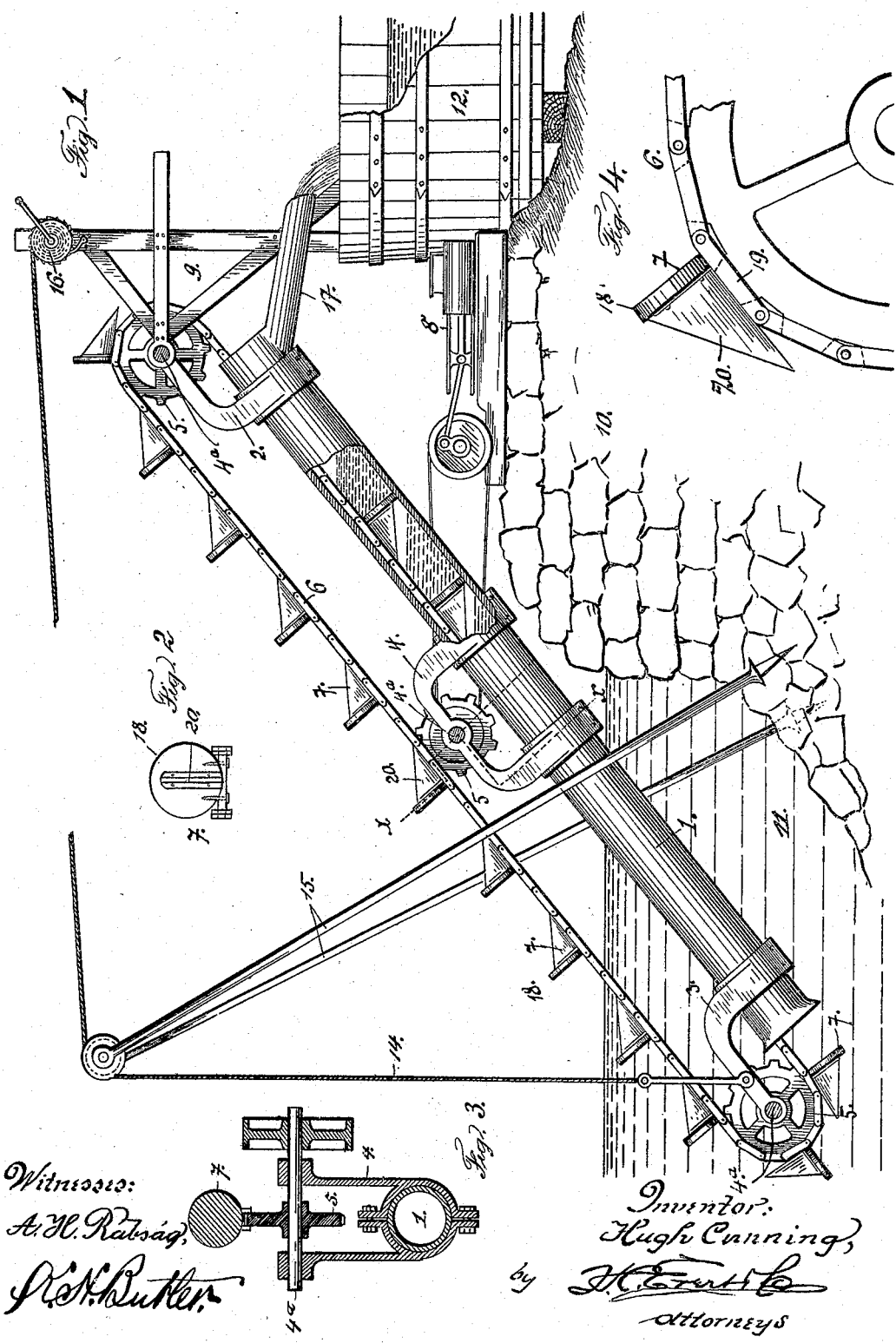

UNITED STATES PATENT OFFICE.

HUGH CUNNING, OF NEW CASTLE, PENNSYLVANIA, ASSIGNOR OF ONE-HALF TO JOHN E. McCREADY, OF NEW CASTLE, PENNSYLVANIA.

PUMP.

No. 930,940.        Specification of Letters Patent.        Patented Aug. 10, 1909.

Application filed June 14, 1906. Serial No. 321,608.

*To all whom it may concern:*

Be it known that I, HUGH CUNNING, a citizen of the United States of America, residing at New Castle, in the county of Lawrence and State of Pennsylvania, have invented certain new and useful Improvements in Pumps, of which the following is a specification, reference being had therein to the accompanying drawing.

This invention relates to improvements in pumps, more particularly to a water conveyer for irrigation purposes, and the object thereof is to provide in a manner as hereinafter set forth a pump that can be easily and quickly erected upon the banks of a river or canal for transferring the water thereof to a suitable reservoir or auxiliary water-way and furthermore not only is the pump adapted for irrigation purposes, but it can be employed for draining swamps, small lakes and basins of water when it is desired to recover the land.

A further object of the invention is to provide in a manner as hereinafter set forth a pump that can be easily and quickly adjusted whereby it may be used in various depths of water, the pump being simple and inexpensive in construction, and easily and quickly operated to deliver or convey a large quantity of water.

In describing the invention in detail, reference is had to the accompanying drawings wherein like reference characters denote corresponding parts throughout the several views and in which:

Figure 1 is a side elevation partly in section of a pump in accordance with this invention. Fig. 2 is a rear elevation of one of the conveyers. Fig. 3 is a cross sectional view on the line X—X of Fig. 1, and, Fig. 4 is an enlarged detail view of a portion of one of the sprocket wheels and a sprocket chain.

The pump comprises a barrel or cylinder 1, having a flared lower end for the purpose of facilitating the entrance of the conveyers or water buckets thereinto. This cylinder or barrel supports a plurality of yokes or bearing frames 2, 3 and 4. The yokes or bearing frames 2 and 3 are similar in construction, one being clamped on the barrel or cylinder, one near the upper end of the latter, and the other clamped on the barrel or cylinder near the lower end of the latter. The yoke or bearing frame has arms projecting therefrom which extend beyond the upper end of the cylinder or barrel, and the yoke or bearing frame 3 has arms which project beyond the lower end of said barrel or cylinder, and in these projecting arms are journaled shafts $4^a$, which carry sprocket wheels 5, over which travels an endless sprocket chain 6 carrying a plurality of conveyers or buckets 7. The yoke or bearing frame 4 is also provided in the arms thereof with a shaft $4^a$ on which is a sprocket wheel 5 to receive said chain 6.

The barrel or cylinder 1 is arranged in an inclined position, supported at the upper end by a standard 9 suitably located on the bank 10 of a stream 11, with said upper end of the barrel or cylinder positioned contiguous to a tank 12. The lower end of the barrel or cylinder extends into the water and is supported by a cable 14 connected to the bracket 3, passing over a pulley carried by a skid 15, and connected to a windlass or winch 16 carried by the standard 9. The barrel or cylinder 1, is provided at its upper end with a suitable discharge spout 17 leading to the tank 12.

The conveyers or water buckets 7 each comprise a disk 18 suitably secured to the links 19 of the sprocket chain 6, and affixed to the back of each disk and to the links of the chain is a brace or strengthening rib 20.

The pump is operated through the medium of a suitable engine 8 having its belt wheel connected by a belt as shown, with a pulley mounted on the shaft $4^a$ carried by the yoke or bearing frame 4.

By reason of the conveyers or water buckets being positioned on the conveyer chain in such a manner that a plurality of these disks are always within the barrel or cylinder, it will be observed that practically a constant stream of water will be discharged from the barrel or cylinder during the operation of the conveyer.

What I claim and desire to secure by Letters Patent, is:—

A pump comprising the combination of a normally inclined barrel provided with a discharge spout, a bearing frame secured to the upper end of said barrel, a vertically extending support positioned at the upper end of the barrel, arms extending through said support, means for pivotally connecting the bearing frame to the arms, a drum rotatably carried by the upper end of the support, a skid straddling said barrel and having a pulley at its upper end, an intermediate bearing frame secured to the barrel, a sprocket wheel journaled in the frame, means for operating said sprocket wheel, a lower bearing frame secured to the barrel, a sprocket wheel supported by said bearing shafts, an endless chain traveling over said sprocket wheel and through the barrel and having motion imparted thereto by the sprocket wheel carried by the intermediate frame, a plurality of circular disks projecting at an angle with respect to said chain, means connected with the chain for supporting said disk, a cable connected with said lower bearing frame, traveling over said pulley and winding upon the drum whereby the position of said barrel can be adjusted, and means for rotating the drum.

In testimony whereof I affix my signature in the presence of two witnesses.

HUGH CUNNING.

Witnesses:
 FRANK CUNNING,
 HENRY MYERS.